March 8, 1938.  J. V. FERRIOT  2,110,839
FOOTWEAR
Filed April 18, 1935
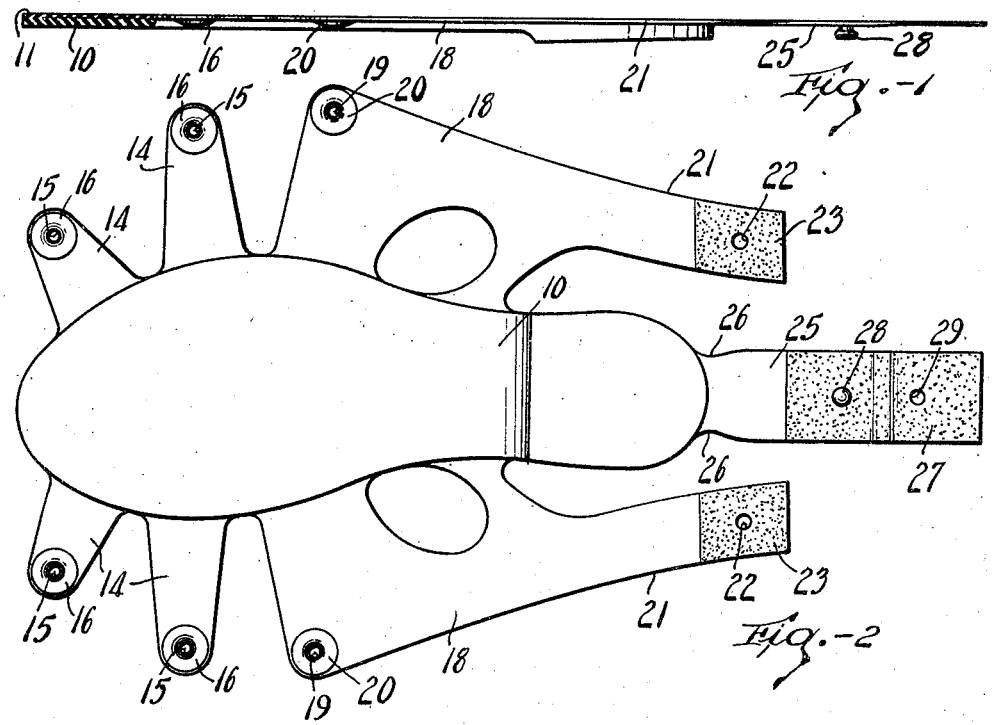
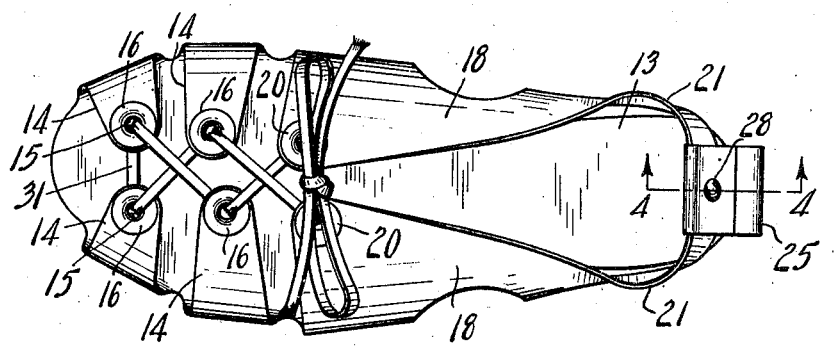
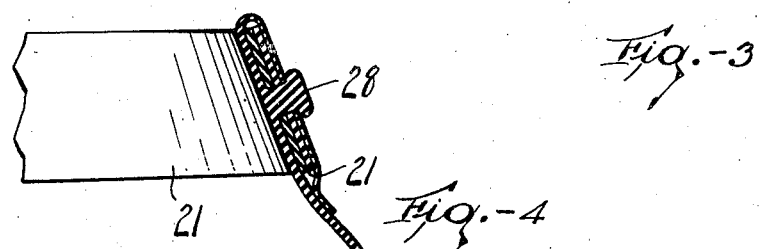
INVENTOR
JOSEPH V. FERRIOT
BY Albert L. Ely
ATTORNEY Patented Mar. 8, 1938

2,110,839

UNITED STATES PATENT OFFICE 2,110,839

FOOTWEAR

Joseph V. Ferriot, Akron, Ohio, assignor to Ferriot Bros. Inc., Akron, Ohio, a corporation of Ohio Application April 18, 1935, Serial No. 17,025

4 Claims. (Cl. 36—11.5)

This invention relates to footwear, and more especially it relates to rubber bathing sandals.

The chief objects of the invention are to provide improved molded rubber bathing sandals; to obviate the use of forms or lasts in the manufacture of rubber sandals; to provide a sandal consisting of a single unitary structure; to provide a sandal of such character that one sandal of any size is adaptable to the requirements of several foot sizes, thereby reducing the amount of equipment required for the manufacture thereof, and reducing the number of sizes to be manufactured; to provide a sandal that is initially produced in flat condition, thereby facilitating manufacture and conserving space required for the storage and/or shipment thereof; and to produce a molded rubber bathing sandal at reduced cost of manufacture. Other objects will be manifest.

Of the accompanying drawing,

Figure 1 is a side elevation partly in section of the improved sandal in its initial flat or blank condition;

Figure 2 is a bottom plan view thereof;

Figure 3 is a top view of the sandal, in its finished condition, ready for wearing; and Figure 4 is a section on a larger scale on the line 4—4 of Figure 3.

Referring to the drawing, it will be seen that the sandal blank is a one-piece rubber structure comprising an outsole portion 10 and a portion comprising insole and upper generally designated 11, said portions being vulcanized together to form a single, unitary structure. It is possible to construct said portions 10 and 11 of one piece of rubber, but the arrangement shown is preferred because it permits the outsole to be made of a tougher, more abrasive-resisting composition, and permits the outsole and upper to be made in contrasting colors. As is clearly shown in Figure 1, one face of the insole and upper 11 is perfectly smooth, whereas the other side thereof is formed with numerous protuberances including the outsole 10. Moreover, as originally produced, the top, smooth face of the structure is disposed in a single plane. The arrangement is such that the sandal may be molded and vulcanized in a simple two-part mold having a molding cavity in one part only, the other part being smooth and plain.

The insole portion of the structure designated 11 is coextensive with the outsole 10 and is designated 13. The portion thereof referred to as the upper comprises short straps 14, 14 projecting from the forward part of the structure, there being two shown on opposite sides of the sandal. The end portions of straps 14 are formed with respective apertures 15 that are reinforced by respective bosses 16 concentric therewith. Obviously the number and arrangement of the straps 14 may be varied to suit different styles and sizes of footwear.

Projecting laterally from each side of the shank portion of the sandal structure are respective instep portions 18, 18, which portions have front and side margins disposed substantially at right angles to each other, and are formed with respective apertures 19 reinforced by bosses 20 at the rounded juncture of said margins. Each instep portion 18 is formed with a rearwardly extending strap 21 that extends beyond the heel portion of the sole structure, and is formed with an aperture 22 adjacent its rear end. The end portion of each strap 18 preferably is roughened on its underside as shown at 23, 23, and said end portions are of diminishing thickness as is most clearly shown in Figure 1.

Extending rearwardly from the portion designated 13 is a heel strap 25 that is somewhat constricted or narrower at 26, 26, adjacent the heel, so as to be capable of flexing thereat without bulging or buckling. The underside of strap 25 is roughened for about two-thirds of its length, as shown at 27, the rear half of said roughened portion being about half the thickness of the remainder of the strap, as shown in Figures 1 and 4. Projecting downwardly from the roughened portion of strap 25 is an integral button 28, and the strap is formed with an aperture 29 located between the button and the free end of the strap. The under face of the several straps and instep portions, which become the exposed faces in the finished sandal, may be ornamented in any desired design in the mold in which they are formed.

The sandals constructed as described may be folded to finished form and provided with laces at the factory where they are made, or they may be shipped to distributors and retailers in flat form and thereafter folded to finished form. The sandals may be compactly packed and stored while in their flat form, so that shipping expense is less when they are so shipped and the distributor folds them preparatory to sale.

In the operation of folding the sandals to finished form, suitable rubber cement first is applied to the roughened portions 23 and 27 of the respective straps 21 and 25. Then strap 25 is flexed upwardly, and the end portions of the two straps 21 are buttoned onto button 28 of strap 25 by means of the apertures 22 in said straps. Then the end portion of strap 25 is folded over the end portions of straps 21 and button 28 inserted through aperture 29 of said strap 25. The strap 25 is of such length that its end portion may be adhered to itself, below the straps 21, as shown in Figure 4. The arrangement is such that the button 28 effects the accurate positioning of the end portions of the several straps, and it holds them securely in place while the cement is drying. Thereafter it supplements the adhesion between the strap-ends by providing a mechanical interlock of the parts, whereby a strong and durable union of the parts is effected.

The sandal is completed by the insertion of a shoe lace 31 through the apertures 15 of toe straps 14 and the apertures 19 of the instep portions 18, as shown in Figure 3. By means of the lace 31 the straps 14 are drawn over toes of the wearer and instep portions 18 drawn firmly about the instep of the wearer, so that the sandal is securely attached to the foot. The arrangement is such that each sandal-size easily accommodates itself to several foot sizes, thereby reducing the equipment required for the manufacture of a full line of sizes, and reducing the amount of stock required to be carried by the retailer to meet any consumer demand.

The sandal is of simple construction, requiring only a lace in addition to its molded structure, is economically manufactured by the method described, and achieves the other objects set out in the foregoing statement of objects.

Modifications may be resorted to without departing from the spirit of the invention or the scope of the appended claims, which are not limited wholly to the specific construction shown.

What is claimed is:

1. A blank for footwear of the sandal type consisting of a one-piece, vulcanized rubber structure comprising a sole portion, toe-engaging means at the forward end thereof, a rearwardly projecting heel strap at the rear thereof, and laterally projecting instep portions in the medial region thereof, said instep portions being formed with respective rearwardly extending straps, the terminal portions of the latter and the heel strap being formed each with an aperture, and the heel strap being formed solely on one face thereof with an integral button that is adapted to pass through said apertures, the other face of the heel strap being smooth.

2. A footwear blank as defined in claim 1 in which the apertured terminal portions of the straps are thinner than the remainder of the strap structures, and are roughened on one face thereof.

3. Rubber footwear of the sandal type consisting of a one-piece, vulcanized rubber structure comprising a sole portion, a plurality of toe straps at the front end portion thereof, oppositely disposed instep portions at the medial region thereof, and a heel strap at the rear thereof formed solely on its rear face with an integral button that extends through respective apertures in rearwardly projecting extensions of said instep portions, said heel strap and instep extensions also being adhesively attached to each other, and a shoe lace threaded through said toe straps and said instep portions.

4. A combination as defined in claim 3 in which the button is disposed relatively remote from the free end of the heel strap, and the end portion of the latter is formed with an aperture in which the button is received, said end portion overlying the end portions of the instep extensions attached to said button.

JOSEPH V. FERRIOT.